May 18, 1943   M. ARENDT   2,319,287
DISPLAY SYSTEM
Filed May 15, 1940   2 Sheets-Sheet 1
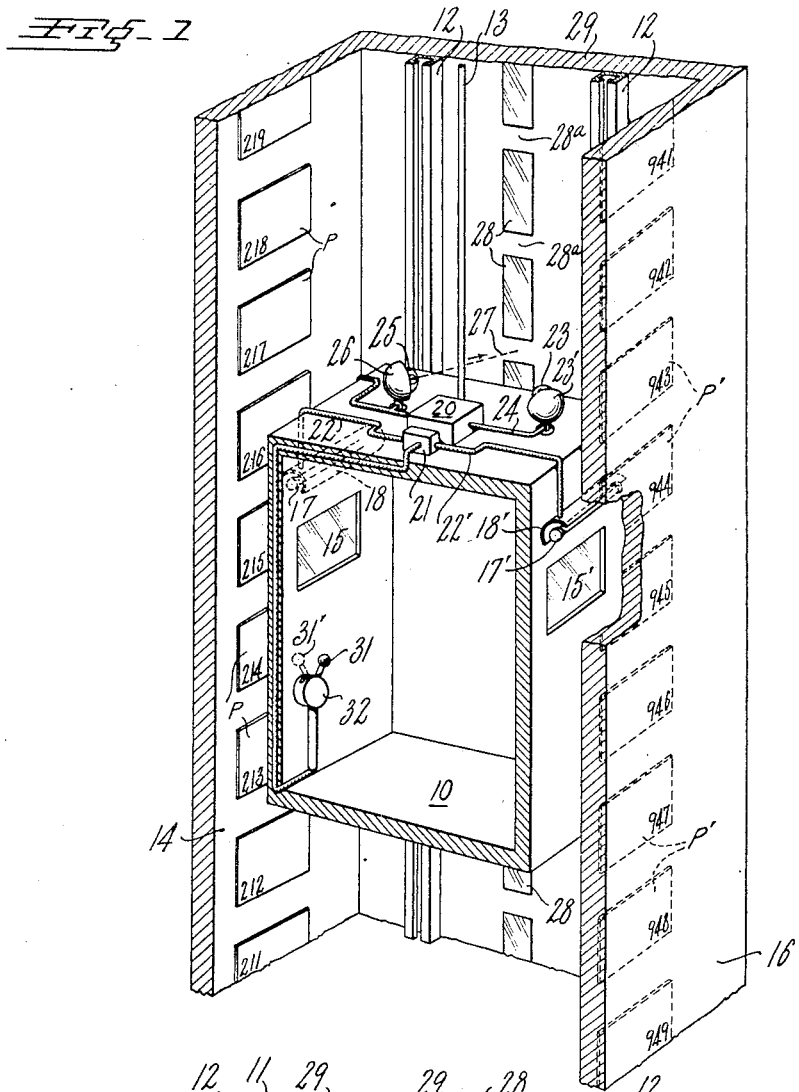
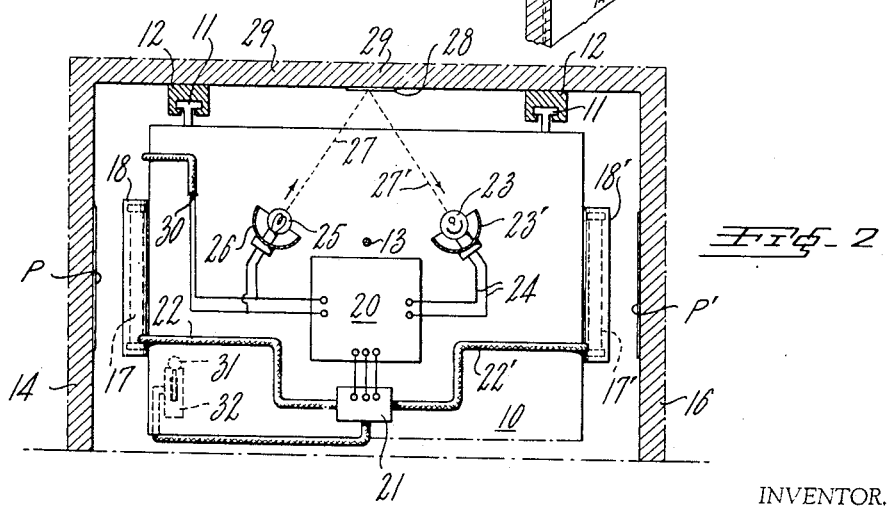
INVENTOR.
MORTON ARENDT
BY
ATTORNEY.

May 18, 1943. M. ARENDT 2,319,287
DISPLAY SYSTEM
Filed May 15, 1940 2 Sheets-Sheet 2
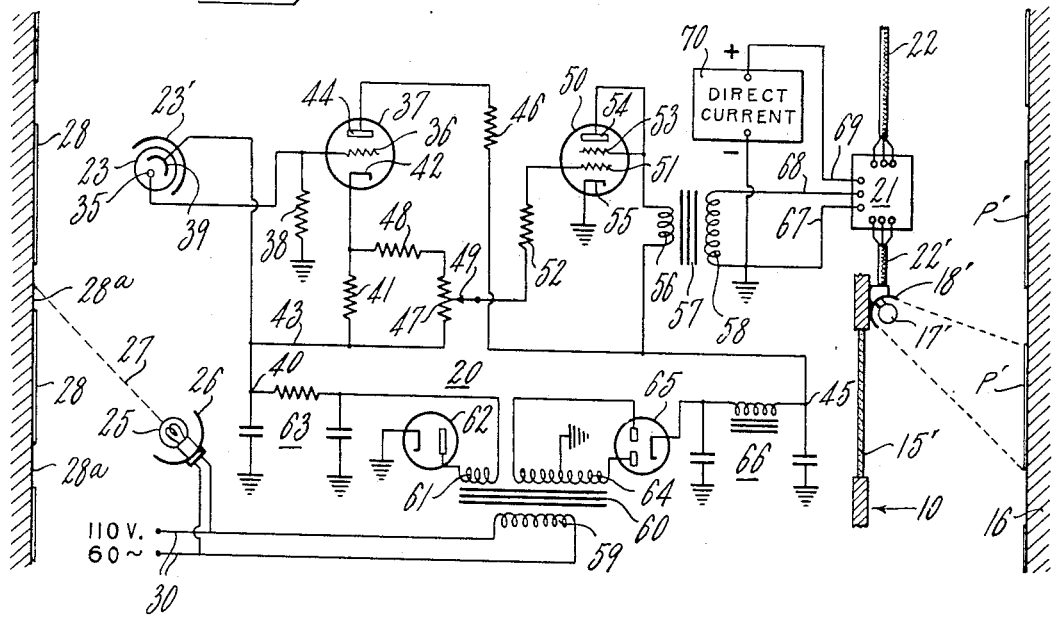
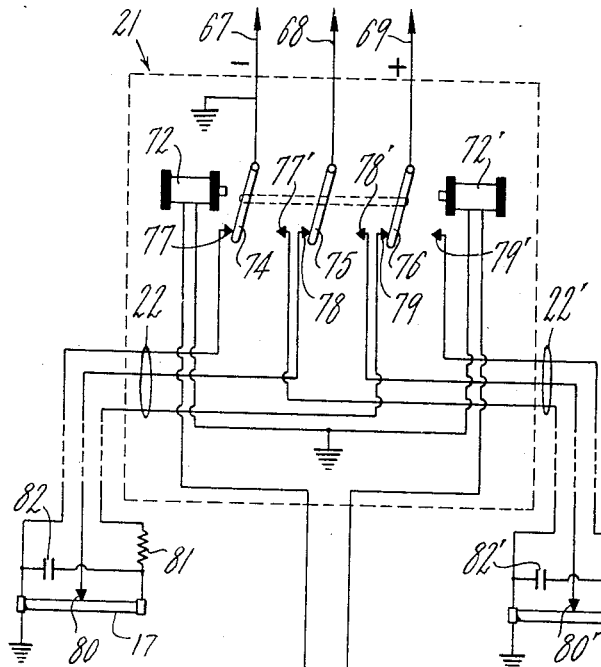
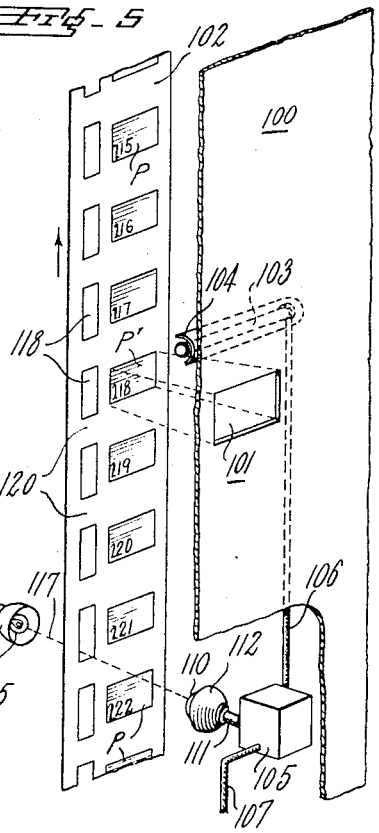
INVENTOR.
MORTON ARENDT
BY
ATTORNEY.

Patented May 18, 1943

2,319,287

UNITED STATES PATENT OFFICE 2,319,287

DISPLAY SYSTEM

Morton Arendt, New York, N. Y.

Application May 15, 1940, Serial No. 335,277

7 Claims. (Cl. 88—16)

This invention relates to display systems incorporating a synchronized flashing light source which is moved with respect to stationary spaced pictures, being a continuation in part of my copending application, Serial No. 329,887, filed on April 16, 1940, entitled "Display systems for moving vehicles."

In the copending application, a display system is disclosed with a flashing light source adjacent each of a series of spaced pictures. Passengers on a moving vehicle, such as a subway train or railway, are thereby enabled to view the series as a motion picture display synchronized with the passage of the vehicle. I have found that in certain applications of the display system, the installation may be substantially simplified and rendered less expensive. In accordance with the present invention, a flashing light source is mounted on the vehicle itself. The flashing is synchronized with the movement of the vehicle in a manner to convey a continuous optical picture effect to observers.

The principle of my present invention in one of its forms is particularly applicable to passenger elevators, escalators or similar vehicles. Spaced stationary pictures along the path of the vehicle are synchronously illuminated from the vehicle, to present the continuous picture effect to the moving passengers. Means are provided by my invention for transferring the illumination and corresponding optical review to the series of pictures arranged in the sequence corresponding to the direction of movement of the vehicle. Thus, one series of pictures is observed on ascending with an elevator; and another series on descending.

It is accordingly an object of the present invention to provide a novel continuous picture display system.

Another object of the present invention is to provide a novel picture display system for passengers on elevators, escalators, and similar vehicles, employing pictures spacedly mounted along the path of the vehicle.

A further object of the present invention is to provide series of spaced pictures of different sequences along the path of a moving vehicle, together with means for selectively observing the picture series corresponding with the direction of movement of the vehicle.

These and other objects of the present invention will become more apparent in the following description of preferred embodiments thereof, illustrated in the accompanying drawings, in which:

Fig. 1 is a diagrammatic illustration, in perspective, of the invention applied to a vertical passenger elevator; Fig. 2 is a plan view of the elevator display system of Fig. 1; Fig. 3 is a schematic electrical diagram of the components constituting the display system of Figs. 1 and 2; Fig. 4 is a schematic circuit diagram of the transfer relay arrangement for the system of Figs. 1, 2 and 3; and Fig. 5 is a diagrammatic showing, in perspective, of a modified form of the invention where the observer is stationary.

The application of the invention for vertical passenger elevators is illustrated in Figs. 1 and 2. It is however to be understood that the invention is equally applicable to escalators or any other type of vehicle with a predetermined path of movement. The elevator car 10 is guided in the usual manner within its shaft. Rails 11, 11 and cooperating tracks 12, 12 are schematically shown, together with hoisting cable 13 attached to elevator car 10. It is to be understood that any suitable established elevator guiding and operating means can be employed for motivating elevator car 10, without affecting the operation of the invention system.

Two series of pictures P and P' are aligned along the walls 14 and 16 of the elevator shaft opposite respective windows 15 and 15' of elevator car 10. The pictures P, spacedly mounted along wall 14 are for viewing during the ascent of elevator car 10, being schematically numbered consecutively in ascending order. Picture numbers 211 through 219 of series P are seen in fragmentary Fig. 1. Similarly, picture series P' on wall 16 are arranged in the descending order for viewing upon the descent of elevator car 10; numbers 941 through 949 appearing in Fig. 1. By the expression picture or scene, I refer to any type of display scene, character, view, printing, picture, representation, image, or the like. The size of the pictures as well as their relative spacing depends upon the size of the elevator windows 15, 15'. Upon illumination of the flashing light source to be described, only one picture of a series should normally be in the field of view of observers in the elevator car.

Sources of illumination 17 and 17' are mounted on the side walls of elevator car 10, opposite the respective series of pictures P and P', and adjacent the respective car widows 15 and 15'. Reflectors 18 and 18' surround light sources 17 and 17' respectively for directing synchronized light flashes upon pictures appearing opposite the car windows. The flashing of lamps or light sources 17, 17' is synchronized with the movement of elevator car 10 through the elevator shaft, as will be described in more detail hereinafter, to effect a continuous motion picture display.

An electronic lamp energizing circuit 20 is arranged on the top of car 10 for performing the flashing of lamps 17, 17'. Lamps 17, 17' are connected to energizing unit 20 by selective relay unit 21, schematically indicated in Figs. 1 and 2, through respective cables 22, 22'. The operation of lamp energizing unit 20 is controlled by photoelectric cell 23 connected to the input of unit 20 by leads 24. A continuous source of illumination 25 is arranged with a reflector 26, directing a light beam 27 towards an alignment of reflector plates 28 spacedly mounted along the inner rear wall 29 of the elevator shaft. Reflector plates 28 are arranged along wall 29 with a center-to-center spacing corresponding to the center-to-center spacing of the pictures of series P and P'.

As car 10 moves up or down light beam 27 is reflected onto photoelectric cell 23 whenever it strikes a reflector plate 28. The respective arrangement of light beam 27, reflector plates 28 and photocell 23 is such as to direct the beam upon the elements of the photoelectric cell. A shield 23' is arranged about photoelectric cell 23 to shade it from extraneous lighting. The electronic circuit of unit 20 is designed to cause lamp 17 or 17' to flash whenever the reflection of light beam 27 onto photoelectric cell 23 is interrupted and then reimpinged, as will be described in detail in connection with Fig. 3. Electric cable 30 energizes lamp 25 and unit 20 as indicated, and may be connected to a 110 volt alternating current or other power source, through suitable conductors generally associated with elevator systems, but not shown in the drawing.

In accordance with the present invention, picture series P is successively illuminated by lamp 17 as upon ascent of elevator car 10 effecting a continuous motion picture display, in a predetermined sequence, to observers in the car. While car 10 is ascending, opposite lamp 17' remains unenergized in the illustrated case, wherein picture series P', arranged for the reverse sequence, is not flashed to the passengers in car 10. The connection of lamp energizing unit 20 to either lamp 17 or 17' is effected through a selective relay unit 21 controlled, in the illustrated embodiment, by handle 31 of the elevator control unit 32. With control handle 31 in the illustrated position, for ascent of car 10, lamp 17 is placed in direct connection with energizing unit 20, and is flashed in synchronism with the upward movement of car 10 to display picture series P. The selective action of unit 21 will be described in more detail in connection with Fig. 4. Similarly, upon descent of elevator car 10, with control handle 31 in the reverse position shown in dotted lines at 31', lamp 17 is disconnected, and lamp 17' connected into operative relation with energizing unit 20. It is to be understood that other means may be employed for selectively switching lamps 17 and 17' to unit 20 in correspondence with the direction of movement of elevator car 10. For example, trip switches may be used which are actuated at the uppermost and lowermost positions of travel of the elevator car. Also, the selective transfer relay 21 may be dispensed with, keeping one or both lamps 17, 17' in operative connection with unit 20 for ascent and descent of car 10.

In accordance with the invention, light source 17 or 17' is illuminated with instantaneous flashes caused by the interruption of the reflected light beam upon photoelectric cell 23, to illuminate the picture opposite window 15 or 15' at the time. The energization of lamps 17, 17' occurs abruptly, with the illumination instantly reaching its maximum value. The illumination is in the form of brilliant flashes opposite the picture to be viewed, synchronously timed with the movement of elevator car 10. The abrupt flashes occur successively, in synchronism with the movement of the elevator car. The reflector plates 28, spaced in accordance with the spacing of the picture series, initiate the abrupt and brilliant light flashes onto the pictures as they come into the field of view of the passengers. The flashes are of such short duration that no blurring occurs in the observation of pictures, regardless of the speed of the elevator car.

The successive progression of the pictures, synchronously illuminated by the brilliant flashes, imparts a smooth and continuous optical effect to the passengers. By arranging pictures of series P, P' as the successive frames of a motion picture display, corresponding to successive frames of a standard motion picture projection system, a continuous animated picture effect is produced. The passengers may view only one of the pictures at a time, through the suitable spacing thereof. The height of the pictures and their respective center-to-center spacing are preferably arranged to cause at least fifteen pictures per second to be observed at the average speed of operation of the elevator.

It is to be understood that shadow plates projecting from a wall of the elevator shaft, corresponding to the shadow plates projecting from the subway train as disclosed in my copending application referred to, and in Patent No. 2,026,753 which issued on January 7, 1936, may be employed instead of reflector plates 38. Such opaque plates are spaced corresponding to that of reflector plates 28, but are arranged rather to interrupt the light beam 27 directed on photoelectric cell 23. Also, several lamps may be connected in parallel for each window if desired.

A preferred circuit arrangement for energizing unit 20 controlling the flashing of light sources 17 or 17' is shown in the schematic diagram, Fig. 3. The anode 35 of photoelectric cell 23 is connected to grid electrode 36 of triode amplifier tube 37. Photo cell anode 35 and grid electrode 36 are connected to ground through a high resistance 38, such as 10 megohms. Cathode 39 of photo cell 23 is connected to negative terminal 40 of a rectifier circuit designed to properly bias the photoelectric tube. A negative potential at terminal 40 of the order of 100 volts is a preferred value. A resistance 41 is connected between cathode 42 of triode 37 and lead 43 connected to cathode 39 of the photo cell.

The anode 44 of triode 37 is connected to positive terminal 45 of the B voltage supply, through resistance 46. A potentiometer 47 is connected across cathode resistance 41 through resistance 48. Variable tap 49 of potentiometer 47 is directly connected to the control grid 51 of an output amplifier tube 50 through a series resistance 52. Amplifier tube 50 may be of any desired type. A highly efficient beam power tube is preferred, with screen grid electrode 53 thereof connected directly to anode 54. Cathode 55 of tube 50 is connected directly to ground. The output of power amplifier tube 50 is connected to the primary winding 56 of a high ratio step-up transformer 57.

The operating voltage supply for the electronic circuit 20 described may be obtained from an ordinary alternating current power lighting source, such as a 110 volt 60 cycle supply connected to primary winding 59 of transformer 60. The biasing supply for photoelectric cell 23 is developed by a low voltage secondary winding 61, one terminal of which is connected to the anode of a diode rectifier tube 62, the cathode of which is grounded; and the other terminal, to the input of a resistance-capacity filter 63. The output terminal 40 of filter 63 is at a negative potential with respect to ground as already described, for suitably biasing the photoelectric cell. The B supply for the unit is generated through a center-tapped secondary winding 64 of transformer 60 the outer terminals of which are connected to the anodes of full-wave rectifier tube 65 having its cathode connected to the input of inductance capacity filter 66. The output terminal 45 of filter 66 is at a positive value with respect to ground. In the preferred embodiment, the potential across primary winding 56 of transformer 57 is of the order of 250 volts.

The operation of the control circuit of Fig. 3 in producing the impulse actuation voltages for gaseous tubes 17, 17' is as follows: While light beam 27 is impinging on photo cell 23 through its reflection from a plate 28, the normal condition of the circuit is such that a sufficiently negative potential with respect to ground exists across resistance 38 and control grid 36 with substantially no current flowing between the anode and cathode of tube 37. In other words, triode 37 is biased to cut-off during the quiescent period of the circuit. When the reflected light beam impinging on photoelectric cell 23 is interrupted upon its impingement on the non-reflective surface 28a between reflector plates 28, the negative potential on grid electrode 36 is substantially decreased or even rendered positive due to a corresponding change in potential across grid resistance 38. Current thereupon flows between cathode 42 and anode 44 of triode 37, causing a corresponding current flow through cathode resistor 41.

Such current flow, or change of current flow, through resistor 41 produces a relatively positive potential thereacross, which positive potential is in turn communicated directly to control grid 51 of output tube 50. The sensitivity or magnitude of the control grid voltage applied to tube 50 is adjustable through tap 49 of potentiometer 47. The positive impulse or signal applied to control grid 51 of tube 50 causes a corresponding current build up through the primary winding 56 of transformer 57. When the light beam reimpinges upon photo cell 23, the current in the primary winding collapses rapidly. The current collapse through primary winding 56 causes a trigger voltage across the second winding 58 of correspondingly greater magnitude, due to the high step-up ratio of transformer 57. A step-up ratio of 50:1 was used in the embodiment, giving a desired potential of the order of 15,000 volts for the trigger impulse to flash lamp 17 or 17'. Transformer 57 is of the constant potential type. It is to be understood that other equivalent circuit arrangements may be used for this action.

The trigger action by circuit 20 is instantaneous and requires no interruption of air gaps or other mechanical arrangements. No time lag is apparent, and no arcing is incurred. The transient or impulse action of the circuit results in a flashing action by the gaseous tubes 17, 17' giving the desirable substantially instantaneous illumination on the pictures. The control of energizing circuit 20 may be other than that described.

The secondary winding 58 of transformer 57, together with a direct current power source 70, is connected to selective relay control unit 21 by leads 67, 68, 69. Unit 21 is in turn selectively connected to lamp 17 or 17' through respective cables 22, 22' as will be described in connection with Fig. 4. Lamp 17' opposite picture series P' is shown in Fig. 3, operative upon the descending movement of elevator car 10. The picture opposite window 15' of car 10 is flashed into view by lamp 17' when light beam 27 from light source 25 impinges upon a non-reflecting surface 28a between spaced plates 28. The flash of lamp 17' is brilliant and instantaneous, and synchronized with the movement of the car as will now be understood by those skilled in the art. A single flash occurs for each picture, constituting a motion picture display for passengers in the car 10.

Fig. 4 shows a preferred arrangement for relay control unit 21, and lamps 17, 17'. Unit 21 selectively switches the output of electronic energizing circuit 20 between gaseous lamps 17 and 17' in accordance with the direction of movement of the elevator car. When elevator control handle 31 is in the illustrated position, a source of energy indicated at 71 is connected to relay solenoid 72 through contact 73 and ground. A three-pole armature 74, 75, 76 is attracted against respective contacts 77, 78, 79 connecting leads 67, 68, 69 from unit 20 to gaseous lamp 17. Lead 67 corresponds to the ground connection on the lamp; lead 68 to the ungrounded terminal of secondary winding 58 of transformer 57, connected to a capacitative tap 80 on tube 17 to initiate the trigger action thereon; and lead 69 to the positive terminal of direct current power source 70, connected to the ungrounded terminal of the gaseous tube 17 through a ballast resistor 81.

In the practical embodiment, lamps 17, 17' were fifteen inches long and one-half inch in diameter. A power source 70 of 1000 volts was used. A resistance of 2000 ohms was found satisfactory for resistor 81. A condenser 82 of about two microfarads was shunted across gaseous tube 17. Condenser 82 is charged by direct current power source 70, and discharged through the gaseous tube 17 upon excitation by the trigger voltage from secondary winding 58 of transformer 57. Direct current power source 70 may be obtained from the motor generator unit mounted on the elevator car, or connected to the moving car by a suitable contactor arrangement. Alternatively, the direct current power source may be obtained by stepping-up the 110 volt alternating current supply of the car to a suitable value and rectifying it on the car as will be understood by those skilled in the art.

The direction of movement of the elevator car is reversed by shifting elevator control handle 31 to the opposite position 31' shown in dotted lines. Relay 72 is thereupon deenergized, and relay 72' energized, attracting relay armatures 74, 75, 76 to the opposite position from that illustrated. Armatures 74, 75, 76 close upon contacts 77', 78', 79', connecting tube 17' to the energizing circuit 20 in place of tube 17. The component connections and elements associated with gaseous tube 17' are similar to those shown and described for tube 17. The result is that picture series P' is illuminated successively to present a motion picture effect to the passengers through window 15' while the car is descending. Picture series P is likewise operatively illuminated while the car is ascending.

It is to be understood that both picture series P and P' may be in continuous circuit connection with energizing unit 20 instead of being selectively operated as described. The result will be that the picture display will be apparent in one sequence upon ascent of the car, and in reverse sequence upon its descent. By suitably designing the picture, interesting advertising and display effects may be seen by the observers in the car in either direction of movement. The display installation is most practicably applied to express elevator cars at the sequence where it usually operates non-stop, at a substantially constant speed, between widely separated floors. A sufficient time is thus afforded for a good display message to the observers in the car.

A modified form of the invention is diagrammatically illustrated in Fig. 5. In this case, the observer is stationary behind a partition or screen 100 in which there is an opening 101 through which the motion picture display is viewed. A series of spaced pictures P is regularly mounted along a belt 102, moved past opening 101. Belt 102 is shown schematically and is of any length or type. The motivating means for belt 102 may also be of any suitable type. A continuous belt is preferred for effecting continuous repetition of the display message. However, this is not essential since rewinding or resetting means may be incorporated. A gaseous tube 103 is arranged on partition 100 within a suitable reflector 104. Reflector 104 directs light generated by tube 103 upon the picture P' at that time in position opposite aperture 101. Lamp 103 is connected to energizing unit 105 by cable 106. Unit 105 corresponds to energizing unit 20 and associated circuit components previously described in connection with lamps 17 and 17'. Cable 107 connects unit 105 to a suitable power source.

A photoelectric cell 110 is connected to energizing unit 105 by connections 111. The reflector unit 112 surrounds photoelectric cell 110 to minimize extraneous light reaching the cell. A source of light 115, surrounded by a reflector 116 directs a beam of light 117 towards photoelectric cell 110. Light beam 117 is arranged to pass through slots 118 on one side of belt 102. Slots 118 are of equal size and are regularly spaced to form effective "shadow plates" 120, which interrupt the passage of light beam 117 to photoelectric cell 110. The position of photoelectric cell 110, light beam 117 and "shadow plates" 120 is such as to cause the successive flashing of gaseous tube 103 when a picture P' is directly opposite aperture 101.

The flashing of gaseous tube 103 is prepared for when the light beam 117 is interrupted by areas 120 on belt 102, and effected upon reimpingement of the beam 117 on the photoelectric cell, as indicated in Fig. 5. The space phase of the trailing edge of the shadow areas 120 with respect to light beam 117 is such that a picture P' (218) will be directly opposite aperture 101 for viewing. Belt 102 is moved at a continuous rate, and is preferably arranged to carry a minimum of 15 pictures P past aperture 101 each second. Lamp 103 is flashed once as each of the pictures reaches the position P' opposite aperture 101. A continuous motion picture effect is thus afforded to spectators looking through aperture 101. It is to be understood that the shadow area corresponding to 120 on belt 102, may comprise projecting "shadow plates" from the belt. Alternately, electrical commutator means may be employed in place of the light beam and "shadow plates."

Although I have described my invention in a preferred embodiment thereof, I am aware that modifications falling within the broader spirit and scope thereof may be made, as will be understood by those skilled in the art, and I therefore do not intend to be limited except as set forth in the following claims.

What I claim is:

1. The combination with a plurality of stationary display scenes linearly spaced along an elevator shaft, of a car movable in said shaft, a lamp arranged on said car opposite said display scenes, means on said car in circuit with said lamp for flashing said lamp in synchronism with the movement of said car past said scenes including a photo-electric cell, and reflector members spacedly arranged along said shaft for causing a light beam carried on said car to intermittently impinge on said cell in accordance with the speed of said car and to correspondingly operate said means, whereby said scenes are individually illuminated in succession to present a continuous animated display effect to observers in said car.

2. In a display system, a first series of linearly spaced display scenes, a second series of linearly spaced display scenes parallel with said first series and arranged in the opposite sequence of display with respect thereto, a vehicle movable in a predetermined path along said display scenes, a lamp arranged on said vehicle opposite each of said series, means for flashing said lamps in synchronism with the movement of said vehicle past said scenes, and mechanism for selectively connecting said lamps into operative relation with said means in accordance with the direction of movement of said vehicle.

3. In an animated display system, a first series of display scenes linearly spaced along an elevator shaft, a second series of linearly spaced display scenes parallel with said first series and arranged in the opposite sequence of display with respect thereto, a car movable up and down in said shaft, a lamp capable of flashing a light beam on a scene for a short duration that is independent of the car speed arranged on said car opposite each of said series, apparatus on said car for intermittently flashing said lamps in synchronism with the movement of said car past said scenes, and means for selectively connecting said lamps with said apparatus in accordance with the direction of movement of said car.

4. In a display system, a first series of display scenes linearly spaced along an elevator shaft, a second series of linearly spaced display scenes parallel with said first series and arranged in the opposite sequence of display with respect thereto, an elevator car movable up and down in said shaft, a gaseous lamp arranged on said car opposite each of said series, means on said car for intermittently flashing said lamps in synchronism with the movement of said car past said scenes, said means including a light responsive element and members spacedly arranged along said shaft for causing a light beam carried on said car to intermittently impinge on said element in accordance with the speed of said car and correspondingly operate said means, whereby said scenes are individually illuminated in succession to present a continuous display effect in the proper sequence to observers in said car.

5. In an animated display system, a first series of linearly spaced display scenes, a second series of linearly spaced display scenes parallel with said first series and arranged in the opposite sequence of display with respect thereto, a vehicle movable in a predetermined path along said display scenes, a gaseous lamp arranged on said vehicle opposite each of said series, means on said vehicle for flashing said lamps in synchronism with the movement of said vehicle past said scenes including a photo-electric cell, members spacedly arranged along said path for causing a light beam carried on said vehicle to intermittently impinge on said cell in accordance with the speed of said vehicle and correspondingly operate said means, and mechanism for selectively connecting said lamps into operative relation with said means in accordance with the direction of movement of said vehicle, whereby said scenes are individually illuminated in succession to present a continuous animated display effect in the proper sequence to observers in said vehicle.

6. In a display system, a plurality of stationary linearly spaced display scenes, a vehicle movable opposite said display scenes, a discharge lamp arranged on said vehicle, means in circuit with said lamp for intermittently flashing it in synchronism with the movement of said vehicle past said scenes, said means including a light responsive element carried on said vehicle, members arranged in a path parallel with that of said scenes for causing a light beam to intermittently impinge on said element in accordance with the speed of said vehicle and the position of each scene for correspondingly operating said means to flash said lamp intermittently on said scenes, and apparatus for causing each flashing of said lamp to be for a short duration that is independent of the vehicle speed.

7. In a display system, a plurality of stationary linearly spaced display scenes, a vehicle movable opposite said display scenes, a discharge lamp arranged on said vehicle, means in circuit with said lamp for intermittently flashing said lamp in synchronism with the movement of said vehicle past said scenes, said means including a light responsive element carried on said vehicle, and reflector members arranged in a path parallel with that of said scenes for causing a light beam carried on said vehicle to intermittently impinge on said element in accordance with the speed of said vehicle and the position of each scene for correspondingly operating said means to flash said lamp intermittently on said scenes.

MORTON ARENDT.